(12) United States Patent
Loda (10) Patent No.: US 7,689,327 B2
(45) Date of Patent: Mar. 30, 2010

(54) MICROSERVER ADAPTER FOR AN AVIONICS BOX

(75) Inventor: David C. Loda, Bolton, CT (US)

(73) Assignee: United Technologies Corporation, Hartford, CT (US)

(*) Notice: Subject to any disclaimer, the term of this patent is extended or adjusted under 35 U.S.C. 154(b) by 799 days.

(21) Appl. No.: 11/602,717

(22) Filed: Nov. 21, 2006

(65) Prior Publication Data
US 2008/0119968 A1 May 22, 2008

(51) Int. Cl.
*G01C 23/00* (2006.01)
(52) U.S. Cl. .............................. 701/3; 701/29; 701/36; 244/158.1; 244/159.4
(58) Field of Classification Search .................. 701/3, 701/29, 33, 36; 244/158.1, 159.4
See application file for complete search history.

(56) References Cited

U.S. PATENT DOCUMENTS

| 5,732,074 | A | 3/1998 | Spaur et al. |
| 6,438,468 | B1 | 8/2002 | Muxlow et al. |
| 6,664,656 | B2 | 12/2003 | Bernier |
| 7,251,554 | B2 | 7/2007 | Loda et al. |
| 7,378,817 | B2 * | 5/2008 | Calhoon et al. ............. 320/108 |
| 2003/0105565 | A1 | 6/2003 | Loda et al. |
| 2003/0163591 | A1 | 8/2003 | Loda |
| 2004/0206818 | A1 | 10/2004 | Loda et al. |
| 2005/0027826 | A1 | 2/2005 | Loda et al. |
| 2005/0165534 | A1 | 7/2005 | Loda et al. |
| 2005/0171651 | A1 | 8/2005 | Loda et al. |
| 2006/0015777 | A1 | 1/2006 | Loda |
| 2006/0164239 | A1 | 7/2006 | Loda |
| 2006/0168090 | A1 | 7/2006 | Loda et al. |
| 2006/0241845 | A1 | 10/2006 | Loda et al. |

FOREIGN PATENT DOCUMENTS

| WO | 2006125014 A2 | 11/2006 |
| WO | 2007055720 A2 | 5/2007 |

OTHER PUBLICATIONS

"Vision for Avionics Interconnects", from http://russellw.com/logbook/vision_for_avionics_interconnects.htm, visited Aug. 22, 2006 (4 pages).

* cited by examiner

Primary Examiner—Gertrude Arthur Jeanglaud
(74) Attorney, Agent, or Firm—Kinney & Lange, P.A.

(57) ABSTRACT

A modular adapter is attachable to an avionics box of an aircraft to enable network communication between the avionics box and other avionics boxes or controllers on the aircraft, local computing devices, and/or remote computing devices or remote servers in an external network, such as an Internet. The adapter includes a microserver module having a web-based server, a computer processor and memory, a data-over-power module configured to connect to a power connector that delivers power to the avionics box and transmits data to the microserver module, a connector module configured to plug into a power port of the avionics box such that power delivered by the power connector passes through the adapter to the avionics box, and a test port connector configured to plug into a test port of the avionics box. The test port connector enables the microserver module to access data from and send data to the avionics box.

54 Claims, 4 Drawing Sheets

MICROSERVER ADAPTER FOR AN AVIONICS BOX

BACKGROUND OF THE INVENTION

The present invention relates to a system for establishing an information network on an aircraft. More specifically, the present invention relates to a microserver adapter configured to connect to an avionics box or subsystem controller on the aircraft to enable communications between the avionics box and other avionics boxes on the aircraft using existing power wires alone or in combination with wired and/or wireless data networks.

An onboard microserver system may be used to create a network centric aircraft maintenance and management architecture for an aircraft, as well as other types of vehicles. The onboard microserver enables local and remote communications to and from the avionics boxes or subsystem controllers on the aircraft using standard Internet communications protocols. Another capability of the microserver architecture is to enable network communication between the various avionics boxes and subsystem controllers on the aircraft.

The onboard microserver system may be easily integrated into a design for a new aircraft or it may be easily installed on a modern aircraft that includes an integrated databus. However, a challenge exists in integrating the microserver architecture into an older aircraft that contains a primitive databus, or no databus at all. Without an integrated communications system, it may be difficult to connect the various avionics boxes and subsystem controllers so that they are able to communicate with one another.

BRIEF SUMMARY OF THE INVENTION

A "plug and play" modular adapter is attachable to an avionics box of an aircraft to enable network communication between the avionics box and other avionics boxes or controllers on the aircraft by using an existing power bus infrastructure on the aircraft as the data network. The adapter includes a microserver module having a web-based server, a computer processor and memory, a data-over-power module configured to connect to a power connector that delivers power to the avionics box and transmits data to the microserver module, a connector module configured to plug into a power port of the avionics box such that power delivered by the power connector passes through the adapter to the avionics box, and a test port connector configured to plug into a test port of the avionics box. The test port connector enables the microserver module to access data from and send data to the avionics box. The adapter may optionally include additional modules, such as a databus module for obtaining additional data input from an existing databus on the aircraft, modules for additional memory or storage capabilities, wireless LAN or other communications modules, or an RFID module.

DETAILED DESCRIPTION

The present invention relates to a modular adapter that is attachable to an avionics box on an aircraft. The microserver adapter includes a web-based microserver and enables network communication on an older, legacy aircraft that has no preexisting communications network. The microserver adapter may also be used on a younger, modernized aircraft that contains a network such as ARINC 429, MIL 1553, or Ethernet. The microserver adapter is configured so that it is easily attachable to a variety of avionics boxes. Due to its modular design, the adapter may be customized to offer different features and capabilities, as well as the ability to easily be upgraded.

Figure 1:
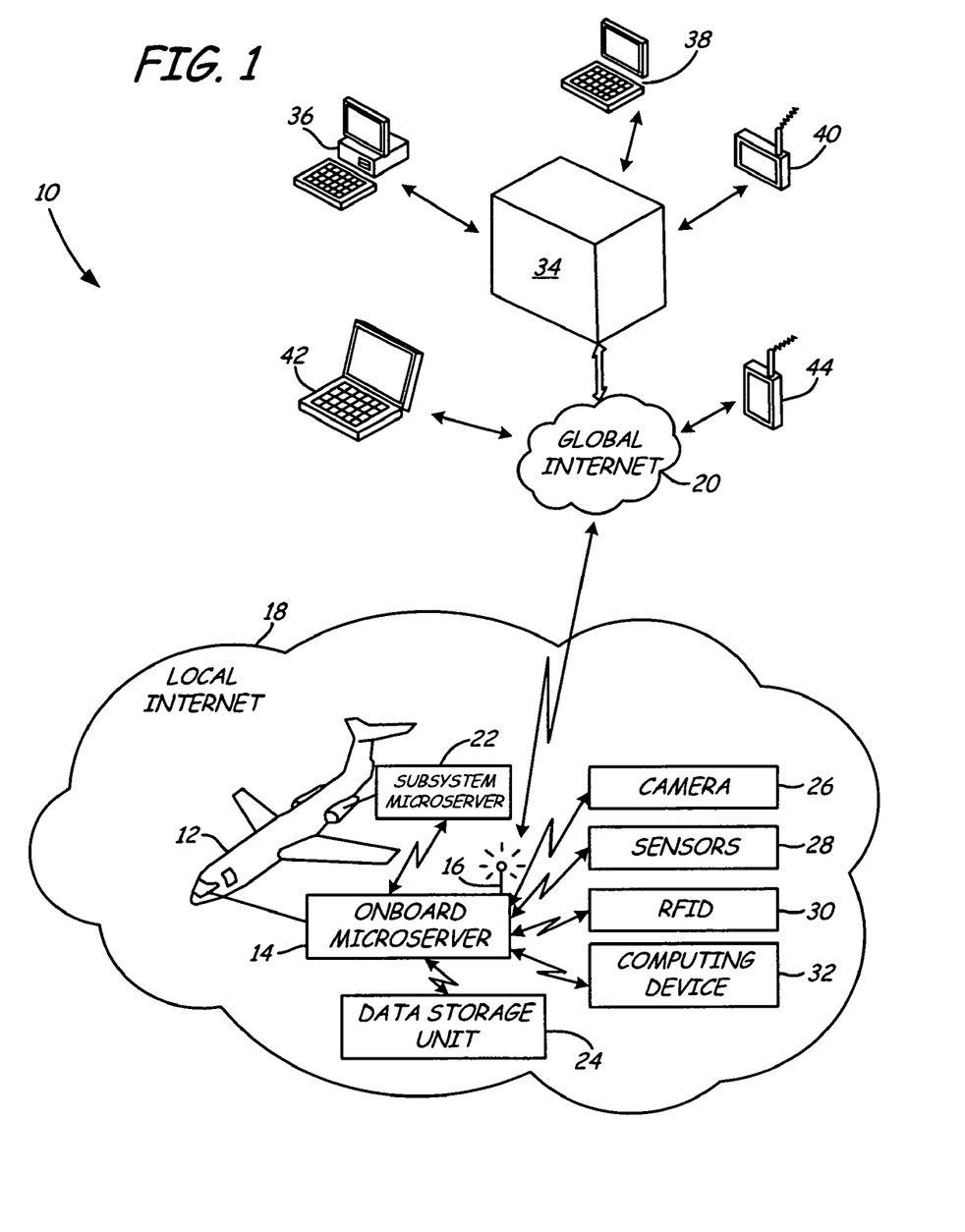
FIG. 1 is a schematic of an onboard microserver system on an aircraft.

FIG. 1 is a schematic of onboard microserver system 10 for aircraft 12. System 10 includes onboard microserver 14, which is installed on aircraft 12. A similar system and corresponding microserver is disclosed in U.S. Patent Application Pub. No. US 2003/0105565.

Onboard microserver 14 creates a network centric aircraft maintenance and management architecture that is configured and reconfigurable to perform many applications and roles for aircraft 12. Such applications include hosting technical information and work instructions onboard the aircraft subsystem, tracking RFID (radio frequency identification) tagged parts for maintenance, tracking cargo modules for bagging using RFID, and other operational requirements. The open architecture system created by onboard microserver 14 allows for mass customization to convert various forms of data into usable knowledge without having to install or create new pieces of hardware for each application. Communication to and from microserver 14 may be through a wired or wireless connection, through satellite, cellular phones, wireless local area networks (WLAN), radio, cable, other microservers on the network, or any other communication means.

Onboard microserver 14 may be configured as a web-based server and a computer processor with memory. As shown in FIG. 1, microserver 14 includes antenna 16, which generates a wireless system 18 (i.e. a local Internet) around aircraft 12. This makes it possible to have two-way wireless communication between aircraft 12 and an onboard computing device through the local Internet. Through microserver 14, it is also possible to have two-way wireless communication with a remote computing device through global Internet 20, as shown in FIG. 1.

Microserver 14 may be installed in the cabin, or any other area of aircraft 12 using existing test ports already wired into the engine/airframe. Microserver 14 may be used to host its own web page that is dedicated to aircraft 12; as a result, microserver 14 may then act as the data gateway to any component of aircraft 12 that is connected to microserver 14. Some or all of the subsystem components of aircraft 12 may each have its own microserver, like subsystem microserver 22 of FIG. 1, which is similar to onboard microserver 14. As a result, the subsystem microservers may each have their own corresponding web pages. For example, subsystem microserver 22 may be mounted to one of the engines (not shown) on aircraft 12. Additional subsystem microservers (not shown) may be similarly mounted or attached to other subsystems of aircraft 12.

Onboard microserver 14 and subsystem microserver 22 are able to communicate through a wired network connection or a wireless connection. A two-way arrow between microserver 14 and subsystem microserver 22 in FIG. 1 indicates a two-way wireless connection; however, it is recognized that a wired connection may also be used.

Microserver 14 may also be connected to data storage unit 24, camera 26, sensors 28, RFID (radio frequency identification) 30, and computing device 32. Sensors 28 may include any type of sensor that provides useful information for operation of aircraft 12, including, but not limited to, vibration or temperature sensors. The various components that are connected to microserver 12 (data storage unit 24, camera 26, sensors 28, RFID 30, and computing device 32) also have a two-way arrow in FIG. 1 between each component and microserver 14, indicating a two-way wireless connection. However, similar to subsystem microserver 22, it is recognized that any of these components may have a wired connection to onboard microserver 14. It is also recognized that additional components not shown in FIG. 1 may easily be connected to microserver 14.

Antenna 16 of onboard microserver 14 creates a hotspot around aircraft 12, such that any user on aircraft 12 may login locally to microserver 14 through the local Internet using any type of computing device 32. Users at a remote location may access microserver 14 remotely using the web page address dedicated to aircraft 12.

Remote access to microserver 14 is possible due to two-way wireless communication between wireless system 18 and global Internet 20. Portal 34, as shown in FIG. 1, may access data from microserver 14 through global Internet 20. Portal 34 functions as a central server that limits access to certain users. Data gathered by microserver 14 may be synchronized to portal 34 as desired. For example, microserver 14 may be programmed to periodically synchronize data to a server hosting portal 34 or to download data on specific events, such as when aircraft 12 lands. As another example, microserver 14 may also synchronize data to portal 34 upon activation of a switch by an operator onboard aircraft 12. Portal 34 may also synchronize data to microserver 14. For example, portal 34 may upload technical manuals to microserver 14 for access by maintenance personnel.

Multiple users may access portal 34 simultaneously. For example, in FIG. 1, computing devices 36 and 38, as well as cell phone 40, are shown as having wireless communication with portal 34. Alternatively, these devices could have a wired connection to portal 34. A personal digital assistant (PDA), as well as other types of computing devices, may similarly be used to access portal 34. Alternatively, computing devices, operated by multiple users, may access data from microserver 14 directly through global Internet 20. As shown in FIG. 1, computer 42 and cell phone 44 may connect to global Internet 20 in order to access microserver 14.

Onboard microserver 14, and resulting wireless system 10, may be used for coordinating aircraft maintenance, employee training, supply chain, and much more. For example, if a remote user, such as a supplier, needs to access data for an engine of aircraft 12, the user can access operating data by simply logging onto the web page for microserver 14, and more specifically to the web page for the server of that engine, if applicable. For security purposes, microserver 14 may be provided with a firewall and security protocols known only to selected individuals, or microserver 14 may utilize additional software or hardware encryption devices and operate as a private network/internet.

Microserver 14 and subsystem microservers, like microserver 22, may be easily installed on an aircraft using existing test ports. Thus, it may be easy to implement onboard microserver system 10 onto aircraft 12 when aircraft 12 is being built or assembled. In that case, system 10 may be configured such that microserver 14 and subsystem microserver 22 may communicate through a wired or wireless connection. On the other hand, if system 10 is to be implemented onto a preexisting aircraft, although it may be easy to attach the microservers to their corresponding subsystems via test ports, it may be difficult to facilitate communication between the microservers. A wireless connection may not work successfully in all areas of the aircraft. In order to create a wired connection, it would be necessary to rewire the aircraft with network wire, which may be time consuming, expensive, and add additional weight to the aircraft. An alternative solution for creating an onboard microserver system on a preexisting aircraft is described herein, which also may be used for a new aircraft.

Figure 2:
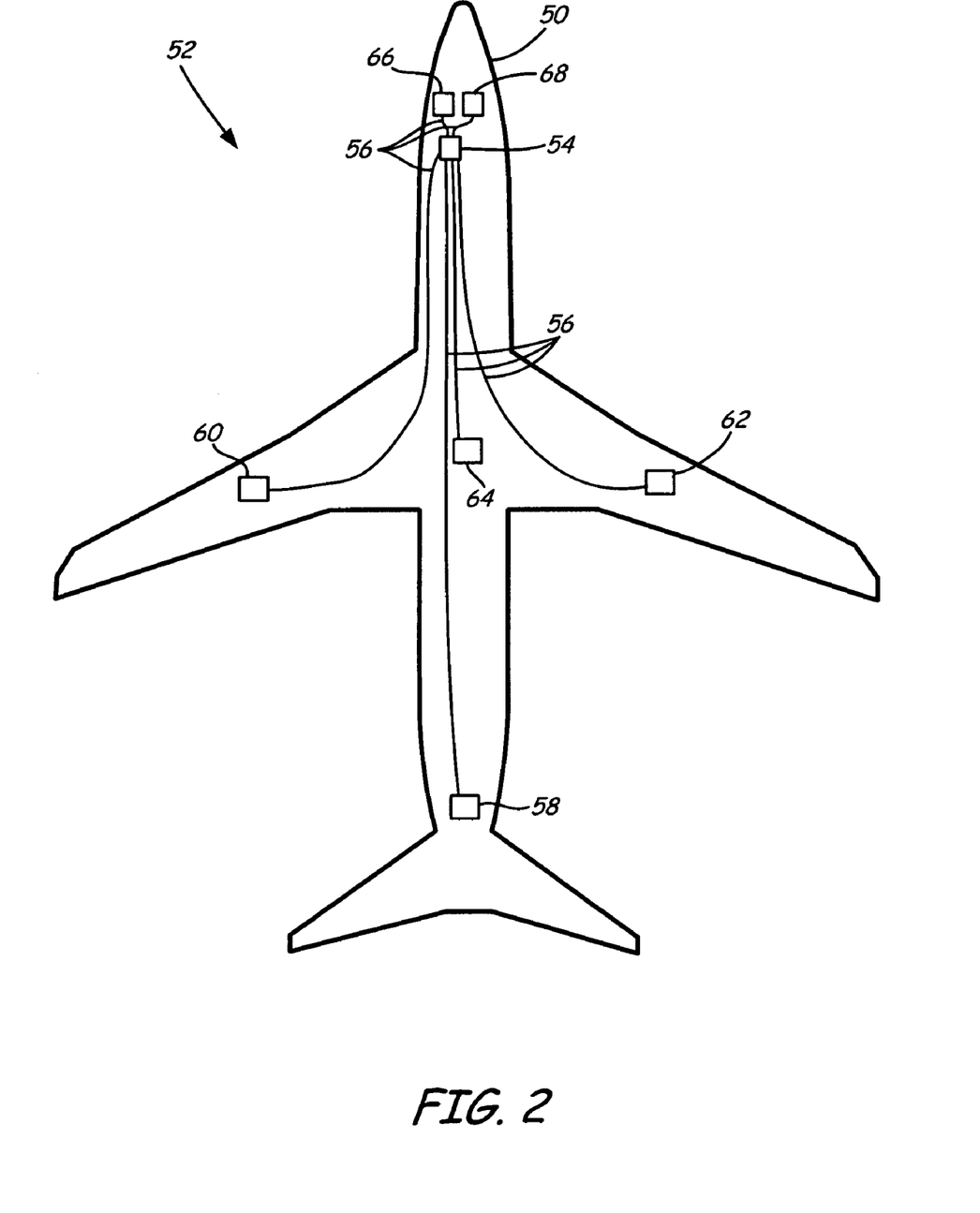
FIG. 2 is a schematic of an aircraft illustrating an electrical distribution system for the aircraft.

FIG. 2 is a schematic of aircraft 50 illustrating electrical distribution system 52 on aircraft 50. Aircraft 50 may be representative of an older aircraft that either does not have a databus or, alternatively, has a primitive databus system. Aircraft 50 includes Electrical Distribution System (EDS) controller 54, wires 56, Auxiliary Power Unit (APU) controller 58, engine controllers 60 and 62, Environmental Control Unit Controller 64, and additional avionics boxes 66 and 68 for other subsystems of aircraft 50.

Aircraft 50 may include several power sources (not shown in FIG. 2), such as generators, that produce power for aircraft 50. Generally speaking, there are three major power systems that may be present on aircraft 50—110 volt AC, 12 volt DC and 28 volt DC. Each power system has a power bus that moves power to various subsystems on aircraft 50 using wires 56. Thus, the power buses, through wires 56, create a network on aircraft 50 for distributing power.

The distribution of power on aircraft 50 is controlled by EDS controller 54. Wires 56 distribute power from EDS controller 54 to the various subsystems shown in FIG. 1, which include APU controller 58, controller 60 for a number one engine, controller 62 for a number two engine, and Environmental Control Unit controller 64.

Controllers 54, 58, 60, 62 and 64 represent various types of avionics boxes that may reside on aircraft 50. For purposes of this disclosure, an avionics box refers to any piece of electronic equipment on an aircraft that has test port capability or network capability, as described in more detail below, and may include radios, controllers, etc. As also shown in FIG. 2, additional avionics boxes 66 and 68 reside near EDS controller 54. An aircraft, like aircraft 50, may include approximately twelve or more avionics box distributed throughout the aircraft and having varying levels of sophistication and functionality. Some of the avionics boxes, like controllers 54, 58, 60, 62 and 64, are responsible for the major subsystems on aircraft 50; thus, they may be high-end avionics boxes capable of managing and controlling each subsystem.

As stated above, aircraft 50 may be an older, legacy aircraft which may not have a databus. Alternatively, aircraft 50 may have an older databus with limited capabilities. In either of those scenarios it may be difficult to collect data from more than one avionics box without having to locally access data from a test port of each box. Moreover, without a databus on aircraft 50, communication between avionics boxes may be limited or non-existent. A system that allows an older aircraft to be easily configured for network communication on the aircraft is described below. This system incorporates the microserver technology described above in reference to FIG. 1, as well as known data-over-power technology, in which an electrical power network is used for transmitting data.

Figure 3:
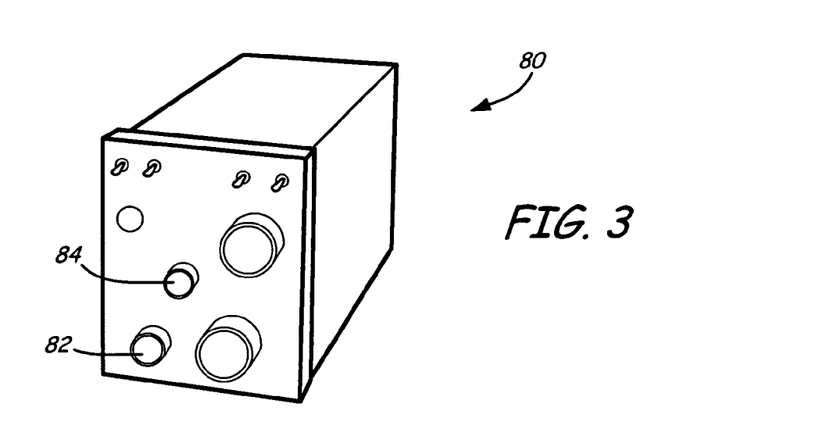
FIG. 3 is a perspective view of an avionics box that is representative of the avionics boxes in FIG. 2.

FIG. 3 is a perspective view of avionics box 80 which is representative of the avionics boxes/controllers shown in FIG. 2. Avionics box 80 includes power port 82 and test port 84. Power port 82 is configured for receiving a standard power connector attached to an electrical wire (similar to wires 56 of FIG. 2) that delivers power to avionics box 80. Test port 84 is a communication port that enables various computing devices to be temporarily connected to avionics box 80. For example, test port 84 may be used by a maintenance worker or a test engineer to connect a personal computer, such as a laptop, to avionics box 80. The connection through test port 84 makes it possible to run diagnostics or provide updates to the firmware and/or the software inside avionics box 80 using a computing device connected via test port 84. As described above, avionics boxes may range in complexity and sophistication, as well as age, depending in part on the aircraft that they are installed on. However, an original avionics box installed on a legacy aircraft still includes a test port similar to test port 84 of FIG. 3.

In those cases in which avionics box 80 is installed on an aircraft without an onboard microserver system, like system 10 of FIG. 1, or another type of communications network, it may only be possible to access data from avionics box 80 by physically connecting a computing device to avionics box 80 through test port 84. This requires that a person travel to avionics box 80 with the computing-device, and it does not enable remote access to data from avionics box 80. A microserver adapter, as described below, which is configured to be connected to test port 84, facilitates local and remote communication with avionics box 80. The microserver adapter thus eliminates a need to temporarily attach a computing device to test port 84 in order to access data from avionics box 80. Moreover, existing power wires (similar to wires 56 of FIG. 2) make it possible for a microserver adapter attached to box 80 to communicate with other microserver adapters on other avionics boxes or subsystem controllers on aircraft 50.

Figures 4, 5:
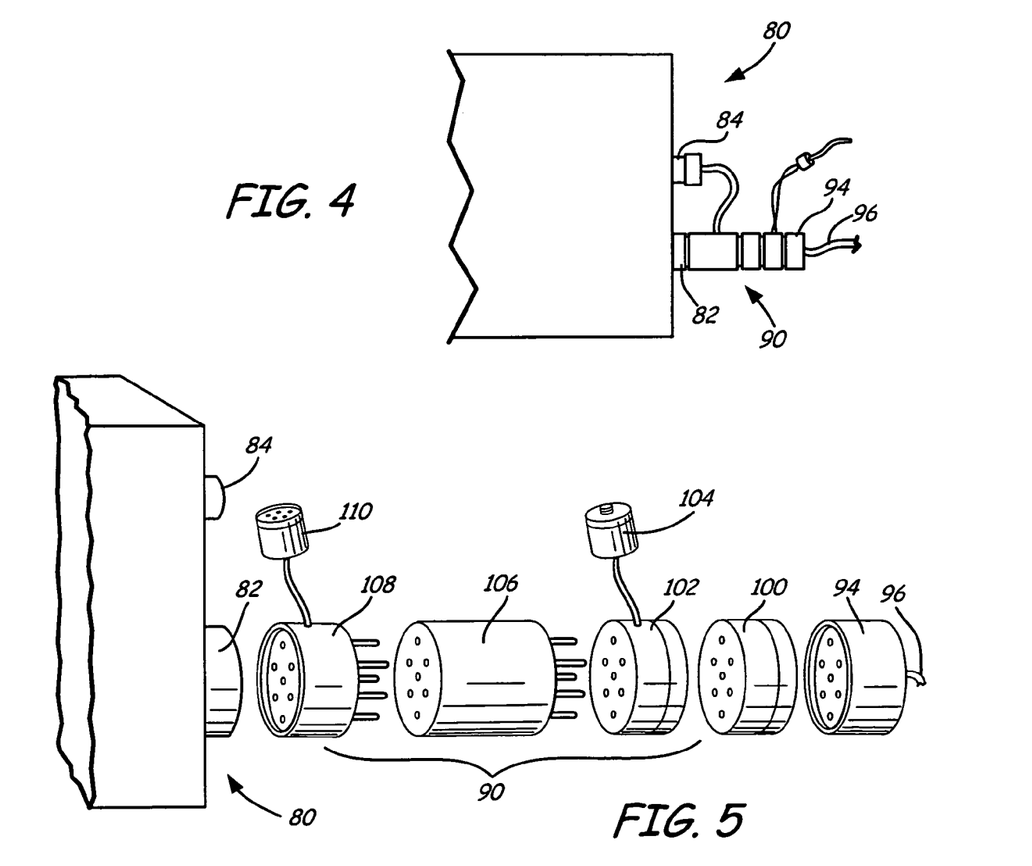
FIG. 4 is a side view of the avionics box of FIG. 3 with a microserver adapter plugged into the avionics box.
FIG. 5 is an exploded view of the avionics box and the microserver adapter of FIG. 4 to illustrate various components of the microserver adapter.

FIG. 4 is a side view of a portion of avionics box 80 from FIG. 3 with microserver adapter 90 plugged into avionics box 80. As shown in FIG. 4, microserver adapter 90 is attached to avionics box 80 by a connection with power port 82 and a connection with test port 84. Microserver adapter 90 is also attached to power connector 94, which is attached to wire 96.

In the absence of microserver adapter 90, power connector 94 may commonly be attached to avionics box 80 through power port 82. As such, wire 96 is able to distribute electrical power to avionics box 80 from an electrical distribution system controller (like EDS controller 54 of FIG. 2) on the aircraft. In order to attach microserver adapter 90 to avionics box 80, all that is required is to unplug power connector 94 from power port 82, plug a first end of microserver adapter 90 into power port 82, and then plug power connector 94 into a second end of adapter 90. In short, adapter 90 is simply inserted between power port 82 and power connector 94. As shown in FIG. 4, an extension of microserver adapter 90 is inserted into test port 84. As described in detail below, microserver adapter 90 may be connected to any piece of avionics equipment with test port capability.

FIG. 5 is an exploded view of avionics box 80, adapter 90 and power connector 94 from FIG. 4 to illustrate various components of adapter 90. In preferred embodiments, microserver adapter 90 is formed from a plurality of modular components that plug together to form adapter 90. As described below, a modular microserver adapter allows for flexibility in terms of being able to plug the adapter into any type of avionics box. Moreover, the modular design makes it easy to upgrade and replace components of the adapter, as desired or as needed, as well as provide optional components that may easily be inserted into the adapter.

In the embodiment of FIG. 5, microserver adapter 90 includes data-over-power module 100, databus module 102 having plug 104, microserver module 106, and connector module 108 having test port connector 110.

Data-over-power module 100 is configured to plug into power connector 94 at one end and into databus module 102 at the other end, as shown in FIG. 5. Alternatively, data-over-power module 100 may plug directly into microserver module 106.

Electrical power from wire 96 is passed through power connector 94 to data-over-power module 100. In addition to delivering power, wire 96 may transmit data to module 100. As described above in reference to FIG. 2, wires 56 on aircraft 50 are part of a power network created by the power buses. As known in the art, an electrical power network, which is used to deliver power to various subsystems, may also be used for transferring data between subsystems. This technology is known as data-over-power. In reference to electrical distribution system 52 of aircraft 50 (see FIG. 2), data may be injected into a power stream running through wires 56.

Data-over-power module 100 includes a circuit board capable of filtering out the data in the power stream and sending the data to microserver module 106. Data-over-power module 100 is also configured to pass power through module 100 with the use of power pins, so that electrical power is delivered to avionics box 80. The other modules of adapter 90, including databus module 102, microserver module 106 and connector module 108, are similarly configured to pass power from wire 96 through to power port 82.

As power from wire 96 passes through modules 100, 102, 106 and 108, each module uses a small percentage of the total power deliverable to power port 84 for operation of the module. For example, microserver module 106 requires electrical power in order to collect, store and process data pertaining to avionics box 80. Module 106 may draw the required power from the power stream as power passes through module 106 on its way to power port 82. In some embodiments, module 106, as well as the other modules, may receive electrical power from a source that is independent of the power bus network.

Using data-over-power technology, an existing power network on the aircraft may be leveraged to transmit data to adapter 90. Transmitting data through wire 96 allows for communication between avionics box 80 and other avionics boxes and controllers on the aircraft.

Microserver module 106 communicates with avionics box 80 and with other microserver adapters that are similarly attached to additional avionics boxes on the same aircraft on which avionics box 80 resides. These communications include a transfer of data to and from avionics box 80 and a transfer of data to and from microserver module 106. To enable these communications, the components of adapter 90 (modules 100, 102, 106 and 108, and test port connector 110) each have an ability to pass data through, similar to the ability described above for passing power through.

Databus module 102, as shown in FIG. 5, is configured to plug into data-over-power module 100 at one end and to microserver module 106 at the other end. Databus module 102 may be an optional component of adapter 90 and is configured to connect to an existing databus network on an aircraft through plug 104 of databus module 102. As stated above, many of the older legacy aircrafts may not have a databus network. In those cases, databus module 102 may be omitted from adapter 90.

The three primary databus networks to date for aircraft are ARINC 429, MIL 1553 (military databus standards), and Ethernet. The two older databus standards, ARINC 429 and MIL 1553, are now being replaced by the newer Ethernet databus. Databus module 102, which is plugged into microserver module 106, may be configured to read data from the databus in either the ARINC 429 or MIL 1553 standard and feed that data to module 106 where it may be stored and/or processed by microserver module 106. Moreover, databus module 102 may also be configured to translate data from the older ARINC and MIL standards and translate the data into the newer Ethernet databus format. Again, the translated data may then be fed from module 102 to microserver module 106. Databus module 102 functions as an optional data feed into microserver module 106.

Adapter 90 is configured to plug into avionics box 80 such that test port connector 110 pulls data from avionics box 80 through test port 84. An existing databus network on the aircraft may contain some overlapping data compared to data collected from avionics box 80 through test port 84. However, in some cases, databus module 102 may be used to access data from the databus network that may not be accessible otherwise. For example, the databus network may pull data from various sensors or other electronic systems on the aircraft which, for various reasons, may not warrant having their own microserver adapter. In those cases, it may not be possible to access data from those sensors through a test port; however, the data may be accessible by connecting databus module 102 to the existing network, and the data may then be sent to and stored on microserver module 106. As explained in more detail below, the data stored on microserver module 106 may then be accessed and processed locally and remotely.

Microserver module 106, as shown in FIG. 5, may be located between databus module 102 and connector module 108. Microserver module 106 is similar to subsystem microserver 22 of FIG. 1; it is a mobile web server that is also configured to function as a local computing workstation. Microserver module 106 is designed to be integrated into a system of microservers that communicate with one another to form a network on an aircraft.

Microserver module 106 may comprise any suitable computer or processing unit known in the art. For example, module 106 may use a Linux-based operating system. Microserver module 106 may contain solid state memory for data storage; and in preferred embodiments, module 106 may be configured such that additional memory storage may be easily added to module 106.

Microserver module 106 is configured to communicate with other microservers that are similarly connected to other avionics boxes or subsystem controllers on the aircraft. Microserver module 106 communicates with other microserver modules by sending data through the power network created by the electrical wires on the aircraft. As explained below in reference to FIG. 6, a central or primary microserver may be included on the aircraft, which enables microserver module 106, as well as the other microserver modules, to communicate with remote or local computing devices through a global Internet or through other networks external or remote to the aircraft.

In some embodiments, microserver module 106 may include a wireless communications device that enables wireless communications between a computing device and microserver module 106. The wireless communications device may create a local wireless field in and around adapter 90. As such, local access to data on microserver module 106 may be feasible independently of a primary microserver. The wireless communications device may be any device capable of functioning as a transmitter and receiver for wireless networking, including, but not limited to, Blue Tooth and WLAN.

As an alternative or in addition to creating a local wireless field in and around adapter 90, the wireless communications device may also be configured to connect to a remote network, such as a network supported by a space satellite station or a ground satellite system. In those cases, the wireless communications device connects with the remote network to enable communications between adapter 90 and a computing device local or remote to adapter 90.

The wireless communications device may be integrated into microserver module 106, or alternatively, an additional module for wireless communications may be inserted among the existing modules of adapter 90 shown in FIG. 5.

The remaining module shown in FIG. 5 is connector module 108 having test port connector 110. As shown in FIG. 5, connector module 108 is configured to plug into microserver module 106 at one end and to power port 82 at the other end. Test port connector 110 is an extension of connector module 108 and is configured to plug into test port 84. As explained above, the various modules that form adapter 90, including connector module 108, are each configured to pass power delivered by wire 96 through to power port 82. Thus, the delivery of power to avionics box 80 is essentially uninterrupted by an insertion of adapter 90 between power port 82 and power connector 94. Test port connector 110 connects to test port 84 and enables adapter 90 to download data to and from avionics box 80.

In the absence of microserver adapter 90, a computing device may be plugged into test port 84 to access and download data from box 80. For example, if avionics box 80 were a subsystem controller of an engine on an aircraft, a service technician could periodically plug into test port 84 to run diagnostics on the engine or to download new software onto the subsystem controller. As stated above, this scenario requires the technician to physically plug his computing device into test port 84. Microserver adapter 90, having microserver module 106, functions in a similar way, and thus is a substitute for hooking up a computing device temporarily to box 80. Microserver adapter 90 allows data from box 80 to be accessed by other computing devices; however, microserver adapter 90 also may be used to facilitate communication of data between box 80 and other avionics boxes on the aircraft.

Adapter 90 is designed to be plugged into a variety of avionics boxes or controllers which may have differing configurations of power ports and test ports. By providing multiple configurations of connector module 108, adapter 90 may be easily integrated with essentially any type of aircraft avionics or controller with test port capability. Connector module 108 may have various designs that account for the varying configurations of power ports and test ports, yet still be configured to plug into or mate with a universal microserver module 106.

For example, as shown in FIGS. 3-5, power port 82 and test port 84 of avionics box 80 are both circular in shape; power connector 94, which is configured to plug into power port 82, is thus also circular in shape. In an alternative design, power port 82 may, as one example, have a rectangular shape; thus, power connector 94 would also have the same shape. In that case, connector module 108 may have a rectangular shape at an end configured to plug into power port 82, and the other end of connector module 108 may still be circular in shape for plugging into microserver module 106. Similarly, data over power module 100 may include various designs with different shapes at one end for mating with different shapes of power connector 94, yet still be circular at the other end for mating with databus module 102 or microserver module 106. Test port connector 110 of connector module 108 may also be designed to account for varying configurations of test port 84.

Microserver adapter 90, as illustrated in FIGS. 4 and 5, has a "plug and play" design and is configured to easily plug into an avionics box on an aircraft. If adapter 90 is to be integrated onto an existing aircraft, adapter 90 is installed by unplugging power connector 94 from power port 82, plugging adapter 90 into power port 82, and plugging power connector 94 into adapter 90. Moreover, in preferred embodiments as shown in FIGS. 4 and 5, adapter 90 has a modular design such that various components of adapter 90 may be plugged into one another. The modular design of adapter 90 is easy to assemble, and also makes it easy to insert additional components into adapter 90 at a later point in time, and remove or replace/upgrade components of adapter 90. Thus, the modules that make up adapter 90 may be customized depending on a particular need or goal. The modular design allows adapter 90 to be plugged into different types of avionics boxes with the use of a single configuration for microserver module 106.

Adapter 90 may include additional modules that are not shown in FIG. 5. Other types of modules that may be integrated into adapter 90 include, but are not limited to, an RFID-reader module, a wireless communications module, and a module for additional memory storage.

It is recognized that variations of adapter 90 as shown in FIGS. 4 and 5 are within the scope of the present invention. For example, test port connector 110 may be an extension of microserver module 106, as opposed to being a part of connector module 108.

In some embodiments, adapter 90 may include a communications port configured to enable a local computing device to plug into adapter 90 through the communications port. The communications port may include, but is not limited to, a USB port and/or an Ethernet port. As opposed to a wireless connection described above, in this case, the local computing device may have a wired connection to adapter 90, and the local computing device is able to access data from microserver module 106. Because microserver module 106 may receive power from the computing device, which is plugged into adapter 90, data from module 106 may be accessed by the computing device without turning on the power bus of the aircraft. The communications port of adapter 90 may be contained within microserver module 106, or any of the other modules of adapter 90 shown in FIG. 5. In other embodiments, an additional module having a communications port may be inserted among the modules of adapter 90 shown in FIG. 5.

A preferred embodiment of adapter 90 is described above and shown in FIGS. 4 and 5 in which adapter 90 has a modular "plug and play" design. In alternative embodiments, the microserver adapter may be essentially one piece containing the various components described above.

Figure 6:
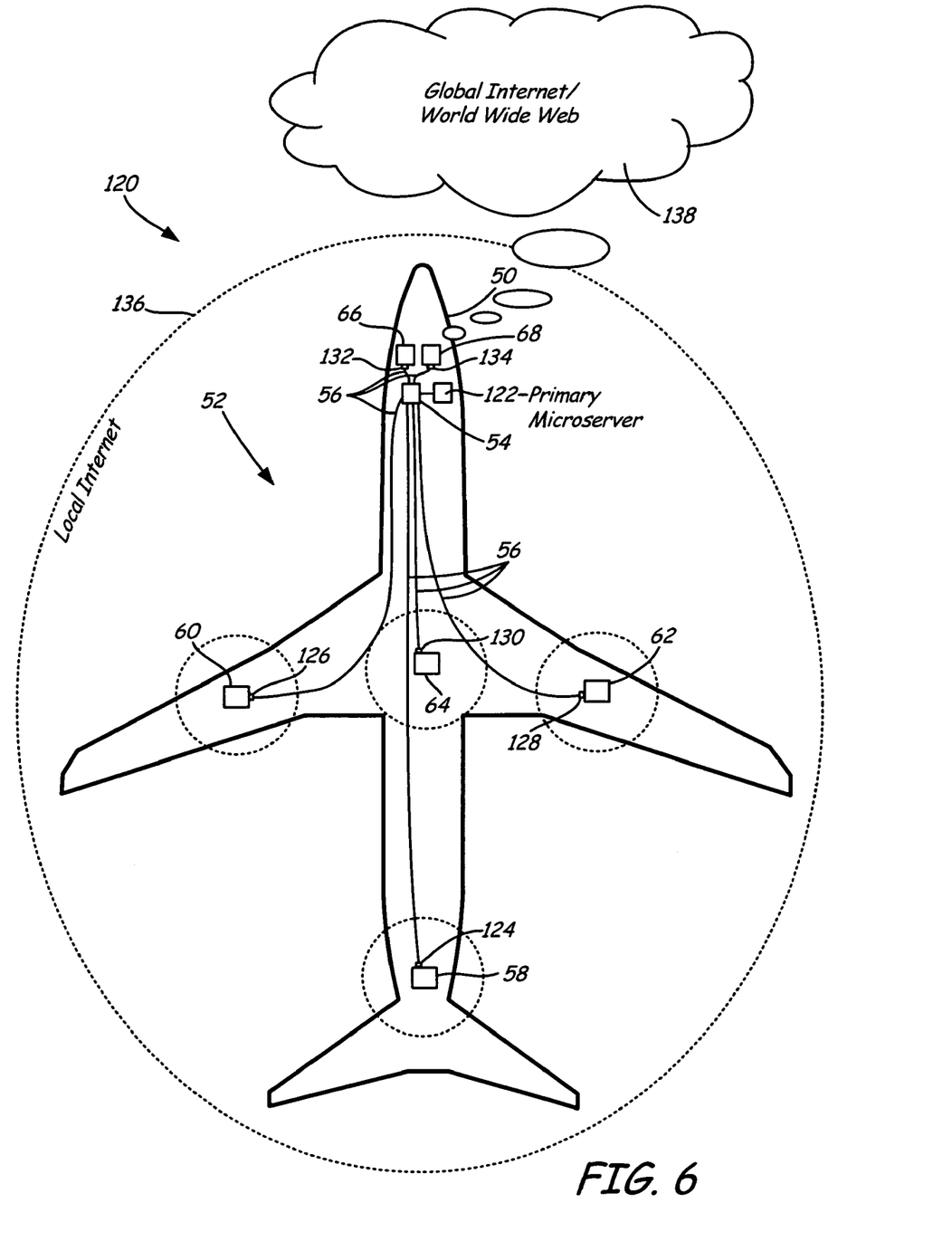
FIG. 6 is a schematic of the aircraft of FIG. 2 having a network system that includes the microserver adapter of FIGS. 4 and 5.

FIG. 6 is a schematic of aircraft 50 of FIG. 1 having network system 120 which includes multiple microserver adapters on aircraft 50 that are similar to microserver adapter 90 of FIGS. 4 and 5. As described above in reference to FIG. 2, aircraft 50 includes electrical distribution system 52, EDS controller 54, wires 56, APU controller 58, engine controllers 60 and 62, Environmental Control Unit controller 64, and additional avionics boxes 66 and 68. Network system 120 generates a local wireless system around aircraft 50, and includes primary microserver 122 and microserver adapters 124, 126, 128, 130, 132 and 134. As shown in FIG. 6, each of the microserver adapters is plugged into one of the avionics boxes 58, 60, 62 64, 66 and 68 on aircraft 50. For example, microserver adapter 124 is plugged into APU controller 58.

As also described above in reference to FIG. 2, multiple power systems (such as 110 volt AC, 12 volt DC and 28 volt DC) on aircraft 50 each have their own power bus configured to deliver power to the various avionics boxes on aircraft 50. Because EDS controller 54 generally controls the distribution of power on aircraft 50, the power buses typically are connected to EDS controller 54. Wires 56 are then used to deliver power from EDS controller 54 to avionics boxes 58, 60, 62, 64, 66 and 68 on aircraft 50. Through known data over power technology, wires 56 may also be used to deliver data to and from the microserver adapters 124-134 to facilitate communication of data among avionics boxes 58, 60, 62, 64, 66 and 68.

Wires 56 thus allow the avionics boxes on aircraft 50 to have two-way communication with one another through microserver adapters 124-134. (This local network communication between the avionics boxes on aircraft 50 may be independent of primary microserver 122.) Enabling two-way communications between the avionics boxes provides an opportunity for aircraft 50 to operate more effectively and more efficiently. For example, the APU unit that corresponds to APU controller 58 is configured to provide bleed air to the two main engines that correspond to engine controllers 60 and 62. During normal operation of aircraft 50, the APU unit is commonly operating at full capacity, even though full operating capacity may not be needed at all times. Therefore, to operate APU controller 58 more efficiently, microserver 124 for APU controller 58 may receive historical data from engine controllers 60 and 62 as to how much bleed air each of the engines used based upon specific parameters. Microserver 124 may feed this data to APU controller 58 so that APU controller 58 delivers a variable amount of bleed air to the engines based on measured conditions.

Microserver adapters 124-134 also may be used to monitor overall operation of each of the avionics boxes. Because the power distributed to each of the avionics boxes passes through the microserver module of each adapter, the microserver module may monitor how much power is flowing to the avionics box and for how long. The microserver module may be programmed to determine if the avionics box is drawing an excessive amount of power. Moreover, if the avionics box stops working properly, this type of data, which may be stored on the microserver module, may be useful in determining why the avionics box is not functioning properly.

As shown in FIG. 6, primary microserver 122 is connected to EDS controller 54. Primary microserver 122 is similar to onboard microserver 14 of FIG. 1, and in preferred embodiments, primary microserver 122 is designed to have superior capabilities and functionality as compared to microserver adapters 124-134. Similar to adapters 124-134, primary microserver 122 is a web server and computer processor; however, primary microserver 122 also includes a communications module that facilitates communications between primary microserver 122 and remote computing devices through the Global Internet. As explained in more detail below, primary microserver 122 acts as a data gateway to connect the microserver adapters to the worldwide web.

Primary microserver 122 contains a data-over-power module similar to module 102 of FIGS. 4 and 5, enabling microserver 122 to also filter out data transmitted through the power stream passing through wires 56. Primary microserver 122 is able to communicate with microserver adapters 124-134 in the same manner by which the microserver adapters are able to communicate with one another—through existing power wires 56.

EDS controller 54, as described above, is connected with each of the power buses on aircraft 50. As such, primary microserver 122 is connected to EDS controller 54 in order for primary microserver 122 to be connected to the various power sources of aircraft 50.

Primary microserver 122 includes an antenna (not shown in FIG. 6) which generates wireless field 136 in and around aircraft 54 (i.e. a local Internet). As described above in reference to FIG. 1 and onboard microserver system 10, primary microserver 122 facilitates two-way wireless communication between aircraft 54 and an onboard computing device through the local Internet. Because primary microserver 122 communicates with microserver adapters 124-134, a local computing device may wirelessly access data from microserver adapters 124-134 through primary microserver 122 and the local Internet.

Moreover, primary microserver 122 enables two-way wireless communication between aircraft 54 and a remote computing device through global Internet/world wide web 138. Primary microserver 122 may send and receive remote communications through global Internet 138 using any type of electronic communication means, including but not limited to satellite, radio frequency, ground-based WLAN, and cellular. Thus, the microserver adapters are also able to send and receive remote communications through primary microserver 122.

As stated above, microserver adapters 124-134 are able to communicate with one another independently of primary microserver 122. Communication between the microserver adapters and other local or remote computing devices is enabled by primary microserver 122. In some embodiments, some or all of microserver adapters 124-134 may also be able to communicate with local computing devices independently of primary microserver 122. Each microserver adapter may contain a wireless LAN device that generates a wireless field around the adapter and the avionics box that the adapter is plugged into. This is illustrated in FIG. 6 by the dashed circles shown around APU controller 58, engine controllers 60 and 62, and environmental control unit controller 64. Using engine controller 60 as an example, microserver adapter 126 enables a local computing device located within the wireless field around engine controller 60 to have two-way wireless communication with adapter 126, regardless of whether primary microserver 122 is operating.

In the embodiment shown in FIG. 6, primary microserver 122 is located in a nose or cockpit area of aircraft 50, and is connected to EDS controller 54. Primary microserver 122 may be located in other areas of aircraft 50, so long as it has connection to each of the power buses on aircraft 50. Moreover, primary microserver 122 may replace one of microserver adapters 124-134 and be connected to one of avionics boxes 58, 60, 62, 64, 66 and 68.

As described above, the various controllers and subsystems of aircraft 50 are able to communicate with one another as a result of the microserver adapters and the ability to transmit data using power wires 56. It is recognized that this data-over-power method may be relatively slow because of limited bandwidth capability. However, in many cases a majority of the data processing resides primarily within the microserver module of each adapter. Because the data between microserver adapters is being communicated post-processing through an HTTP web protocol, which is more tolerant of slower speeds and asynchronous connections, the potentially slower speeds are not problematic.

Plugging a microserver adapter into the test port of an avionics box makes it feasible to use a computing device locally or remotely to access data from the avionics box without requiring that the computing device be plugged into the test port. As such, a remote user may run diagnostics on the avionics box or access historical data from the avionics box. In preferred embodiments, the microserver module of the adapter is programmed so that it is not feasible to change the firmware of the avionics box or disable the avionics box using the microserver module; rather, the microserver module is designed to facilitate a passive data read and the ability to run diagnostics on the avionics box locally or remotely. However, in alternative embodiments, the microserver module may be configured to more actively control an operation of the avionics box by allowing, for example, firmware updates or a shut down of the avionics box. This may be done through stringent controls, such as remote activation with sophisticated pass codes, to ensure that no unauthorized access or updates are allowed.

The microserver adapters may also be used with optional mission equipment installable on an aircraft. For example, if weather-related sensors are later added onto an aircraft, the weather sensors may include a controller or avionics box having a test port that may receive a microserver adapter. The weather sensors may then be integrated into the power network on the aircraft by connecting the controller and the microserver adapter to a wire leading form one of the power buses on the aircraft. As such, data from the weather sensors, which may be collected while the aircraft is in-flight, may be accessed from a remote location using the primary microserver and the global Internet.

The microserver adapters described herein, as well as the primary microserver, may be integrated on an older aircraft to provide network capabilities between the various subsystems of the aircraft, and to enable local and remote wireless communication with the subsystems of the aircraft. This is easily done using preexisting wires on the aircraft. The microserver adapters and the primary microserver are also designed to be easily integrated into a newer aircraft that has an existing databus network, or to be included in the design and assembly of a brand-new aircraft. In summary, the microserver adapters may be used onboard any aircraft and with any piece of avionics equipment that is connected to the power network and has test port capability.

Although the present invention has been described with reference to preferred embodiments, workers skilled in the art will recognize that changes may be made in form and detail without departing from the spirit and scope of the invention.

The invention claimed is:

1. A modular adapter attachable to an avionics box of an aircraft to enable network communication between the avionics box and other avionics boxes or controllers on the aircraft, the adapter comprising:
   - a microserver module having a web-based server, a computer processor and memory;
   - a data-over-power module configured to connect to a power connector that delivers power to the avionics box and transmits data to the microserver module;
   - a connector module configured to plug into a power port of the avionics box such that power delivered by the power connector passes through the adapter to the avionics box; and
   - a test port connector configured to plug into a test port of the avionics box, wherein the test port connector enables the microserver module to access data from and send data to the avionics box.

2. The adapter of claim 1 wherein the power connector is attached to an electrical wire that delivers power to the avionics box and delivers power and data to the microserver module.

3. The adapter of claim 1 wherein the data-over-power module includes a circuit board that filters data from the power connector.

4. The adapter of claim 1 wherein the microserver module, the data-over-power module and the connector module are each configured to pass power from the power connector through to the power port of the avionics box.

5. The adapter of claim 1 wherein the test port connector, the data-over-power module and the connector module are each configured to allow data to pass through.

6. The adapter of claim 1 wherein the microserver module is connected to the data-over-power module, and the microserver module utilizes a portion of the power deliverable from the power connector to the avionics box.

7. The adapter of claim 1 wherein the test port connector extends from the connector module.

8. The adapter of claim 1 wherein the adapter further comprises a wireless communications device configured to enable wireless communication between a computing device and the adapter.

9. The adapter of claim 8 wherein the wireless communications device is configured to create a local wireless network in and around the adapter and the avionics box.

10. The adapter of claim 8 wherein the wireless communications device is configured to connect to a remote network to enable wireless communication between the computing device and the adapter.

11. The adapter of claim 10 wherein the computing device is local to the adapter or remote from the adapter.

12. The adapter of claim 1 wherein the adapter further comprises a communications port configured to enable a local computing device to plug into the communications port to communicate with the microserver adapter and access data from the avionics box.

13. The adapter of claim 12 wherein the communications port is selected from a group consisting of a USB port and an Ethernet port.

14. The adapter of claim 1 wherein the adapter further comprises a databus module configured for connecting to an existing databus network on the aircraft and accessing data from the existing databus network.

15. The adapter of claim 14 wherein the databus network on the aircraft is selected from a group consisting of ARINC 429, MIL 1553 and Ethernet.

16. The adapter of claim 14 wherein the databus module is configured to access data in an ARINC 429 format or a MIL 1553 format and translate the data into an Ethernet format.

17. The adapter of claim 1 further comprising a fourth module selected from a group consisting of an RFID-reader module, an additional memory storage module, a module for additional computer processing, a wireless communications module, and a module having a communications port.

18. The adapter of claim 1 wherein the microserver module is configured to process and store data from the avionics box.

19. The adapter of claim 1 wherein the microserver module is configured to monitor power delivered to the avionics box as a function of time.

20. A microserver adapter insertable between an avionics box on an aircraft and a power connector used to deliver electrical power to the avionics box, the adapter comprising:
a microserver having a web based server and a computer processor;
means for receiving data sent through an electrical wire attached to the power connector;
means for passing power delivered by the electrical wire through the adapter to the avionics box; and
means for communicating with the avionics box, wherein the microserver stores and processes data from the avionics box.

21. The microserver adapter of claim 20 wherein the means for communicating with the avionics box includes a connector configured to plug into a test port of the avionics box.

22. The microserver adapter of claim 20 wherein the avionics box is a subsystem controller of the aircraft.

23. The microserver adapter of claim 22 wherein the subsystem controller is selected from a group consisting of an engine controller, an auxiliary power unit controller, an electrical distribution system controller, and an environmental control unit controller.

24. The microserver adapter of claim 20 further comprising:
means for using the electrical wire to send data from the microserver to other microservers located on the aircraft.

25. The microserver adapter of claim 20 further comprising:
means for creating a local wireless network around the avionics box.

26. The microserver adapter of claim 25 wherein the local wireless network enables a local computing device to wirelessly access data stored on the microserver.

27. The microserver adapter of claim 20 further comprising:
means for plugging a local computing device into the adapter.

28. The microserver adapter of claim 27 wherein means for plugging a local computing device into the adapter includes a USB port and/or an Ethernet port.

29. The microserver adapter of claim 20 further comprising:
means for connecting with an existing network on the aircraft.

30. An assembly for establishing a communications network on an aircraft having a plurality of avionics boxes, the assembly comprising:
a central microserver that creates a wireless system around the aircraft;
a plurality of wires configured for distributing power generated on the aircraft to the various avionics boxes;
a plurality of adapters, wherein each adapter is configured to connect to each avionics box and communicate with other adapters and the central microserver, each adapter comprising:
a subsystem microserver having a web based server and a computer processor;
means for passing power generated on the aircraft through to the avionics box;
means for using the wires for a two-way transmittal of data between the subsystem microservers and the central microserver; and
means for two-way communication between the microserver and the avionics box.

31. The assembly of claim 30 wherein the central microserver includes a communication module that enables remote communication with the subsystem microservers through a global Internet.

32. The assembly of claim 30 wherein the central microserver enables local communication with the subsystem microservers through a local Internet.

33. The assembly of claim 30 wherein means for passing power generated on the aircraft through to the avionics box includes a module configured to connect to a power port of the controller.

34. The assembly of claim 30 wherein means for using the wires for a two-way transmittal of data includes a data-over-power module for filtering out data transmitted through the wires.

35. The assembly of claim 30 wherein means for two-way communication between the microserver and the avionics box includes a test port connector configured to plug into a test port of the avionics box.

36. The assembly of claim 30 wherein each adapter further comprises means for connecting to an existing databus network on the aircraft.

37. The assembly of claim 36 wherein the databus network is selected from a group consisting of ARINC 429, MIL 1553, and Ethernet.

38. The assembly of claim 30 wherein each adapter further comprises means for communicating wirelessly with the adapter.

39. The assembly of claim 30 wherein each adapter further comprises means for plugging a local computing device into the adapter.

40. The assembly of claim 30 wherein the subsystem microserver of each adapter stores and processes data from the avionics box.

41. The assembly of claim 30 wherein the subsystem monitors and measures power delivered to the avionics box.

42. A method of modifying an aircraft to create a communications network on the aircraft, the method comprising:
installing a central microserver on the aircraft to create a wireless system around the aircraft;
attaching an adapter to an avionics box on the aircraft, wherein the adapter includes a subsystem microserver for storing and processing data from the avionics box; and
using wires configured for delivering power to the avionics box to transmit data between the master microserver and the adapter.

43. The method of claim 42 further comprising:
attaching a second adapter to a second avionics box, wherein the second adapter includes a second subsystem microserver and is configured to communicate with the first adapter and the central microserver.

44. The method of claim 42 further comprising:
accessing data remotely from the avionics box through the central microserver and a global Internet.

45. The method of claim 42 further comprising:
accessing data wirelessly from the avionics box using a local computing device.

46. The method of claim 42 further comprising:
communicating remotely with the avionics box through the central microserver and a global Internet.

47. The method of claim 42 wherein the adapter includes a plurality of modules configured to be easily inserted and easily removed from the adapter.

48. The method of claim 42 further comprising:
connecting the central microserver to a controller of an electrical distribution system on the aircraft.

49. The method of claim 48 wherein at least one power bus on the aircraft is connected to the electrical distribution system controller.

50. A kit for assembling a modular adapter configured to attach to an avionics box on an aircraft and facilitate network communication between the avionics box and other avionics boxes and controllers on the aircraft, the kit comprising:
a microserver module having a first end and a second end;
a set of connector modules, wherein each connector module has a first end attachable to a power port of the avionics box and a second end attachable to the microserver module, and the set includes various configurations of connector modules for attaching the first end of the module to one of a plurality of configurations for the power port; and
a set of data-over-power modules, wherein each data-over-power module has a first end attachable to the microserver module and a second end attachable to a power connector for delivering power to the avionics box, and the set includes various configurations of data-over-power modules for attaching the second end of the module to one of a plurality of configurations for the power connector.

51. The kit of claim 50 further comprising:
a set of test port connectors, wherein each test port connector has a first end attachable to a test port of the avionics box and a second end attachable to a connector module or a microserver module, and the set includes various configurations of test port connectors for attaching the first end of the connector to one of a plurality of configurations for the test port.

52. The kit of claim 50 further comprising a set of supplemental modules, wherein each supplemental module is configured to easily be inserted between the connector module and the microserver module.

53. The kit of claim 52 wherein the set of supplemental modules are selected from a group consisting of an RFID-reader module, a module for additional memory storage, a module for additional computer processing, a wireless communications module, and a module having a communications port.

54. The kit of claim 50 further comprising a databus module configured to be inserted between the microserver module and the data-over-power module, wherein the databus module facilitates communication between the microserver and a databus network on the aircraft.

* * * * *